United States Patent
Krotine

Patent Number: 5,962,350
Date of Patent: Oct. 5, 1999

[54] FLOOR MAT

[76] Inventor: Gilbert Micheal Krotine, 134 Edgewood Dr., Grafton, Ohio 44044

[21] Appl. No.: 09/036,547

[22] Filed: Mar. 6, 1998

[51] Int. Cl.$^6$ ..................................................... B32B 5/22
[52] U.S. Cl. .......................... 442/370; 442/383; 442/400; 442/402; 428/95
[58] Field of Search .............................. 442/118, 79, 383, 442/402, 370, 400; 428/95

[56] References Cited

U.S. PATENT DOCUMENTS

| | | | |
|---|---|---|---|
| 2,057,873 | 10/1936 | Atwood | 154/49 |
| 3,577,581 | 5/1971 | Stata | 15/215 |
| 3,578,738 | 5/1971 | Hughes | 15/215 |
| 4,377,614 | 3/1983 | Alfter et al. | 428/213 |
| 4,484,250 | 11/1984 | Rzepecki et al. | 361/220 |
| 4,822,669 | 4/1989 | Roga | 428/287 |
| 5,021,277 | 6/1991 | Fan | 428/76 |
| 5,114,774 | 5/1992 | Maxim, Jr. . | |
| 5,130,187 | 7/1992 | Eberhardt | 428/95 |
| 5,328,759 | 7/1994 | McCormack et al. . | |
| 5,429,854 | 7/1995 | Currie et al. | 428/138 |
| 5,434,339 | 7/1995 | La Motte et al. . | |
| 5,500,267 | 3/1996 | Canning . | |
| 5,714,229 | 2/1998 | Ogden . | |

Primary Examiner—John J. Zimmerman
Assistant Examiner—Jason Savage
Attorney, Agent, or Firm—Sand & Sebolt

[57] ABSTRACT

A floor mat includes an upper layer having a top surface and a bottom surface with the upper layer capable of absorbing liquid and wicking the liquid from the top surface toward the bottom surface of the top layer. The upper layer allows water to evaporate from the floor mat so that it may dry. The mat also includes an upper intermediate layer disposed adjacent the upper layer. The upper intermediate layer is capable of wicking liquid from the upper layer and retaining the liquid within its body. A lower intermediate layer is disposed adjacent the upper intermediate layer. The lower intermediate layer is also capable of absorbing and retaining liquid from the upper intermediate layer when the upper intermediate layer is fully saturated. A liquid impervious layer is disposed below the lower intermediate layer such that water may not seep out of the bottom of the lower intermediate layer. A non-slip layer is disposed on the bottom of the liquid-impervious layer to prevent the floor mat from slipping on a wet floor. An edge binding extending about each of the layers holds the layers together and wicks water back into the floor mat from the area immediately surrounding the mat.

18 Claims, 3 Drawing Sheets

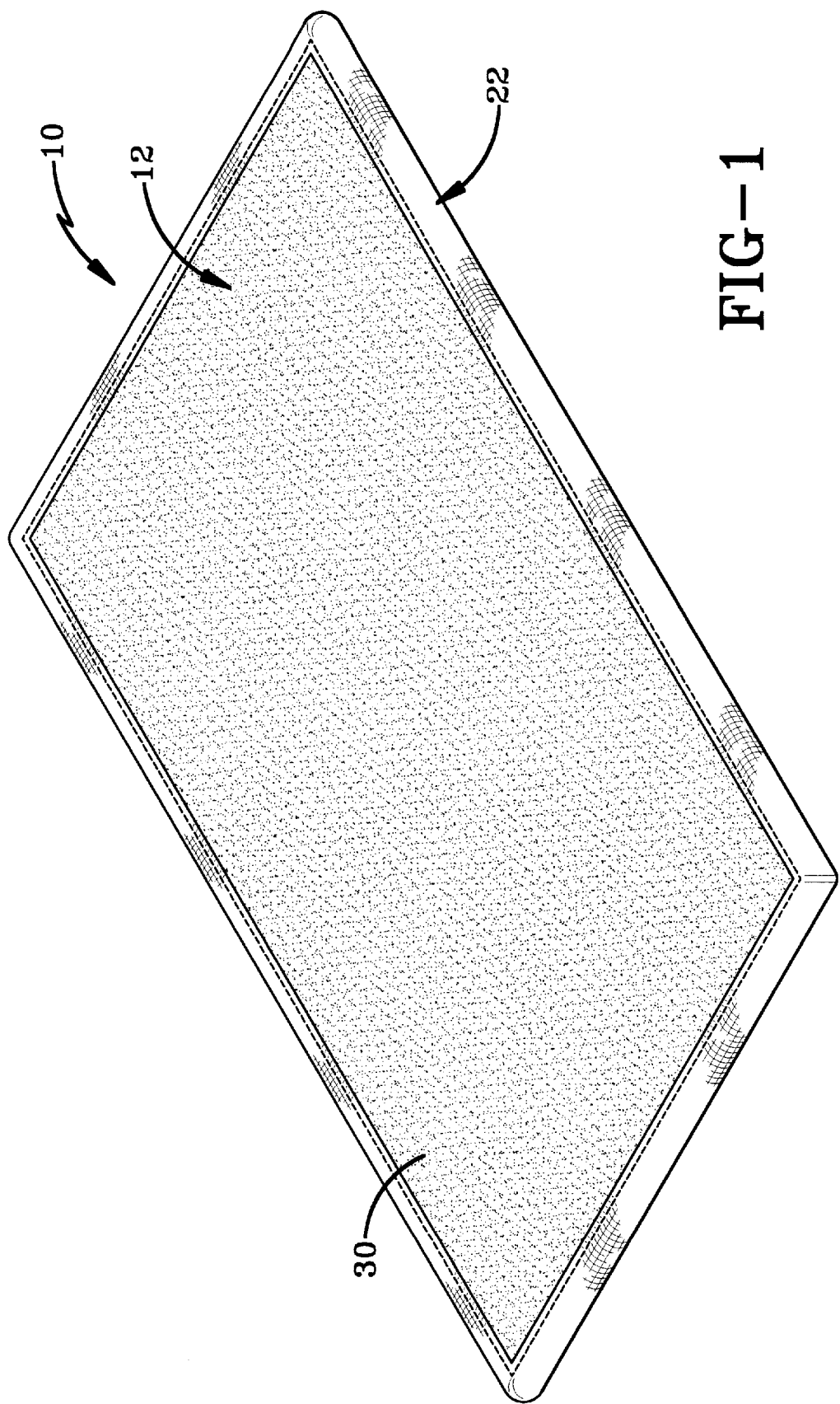

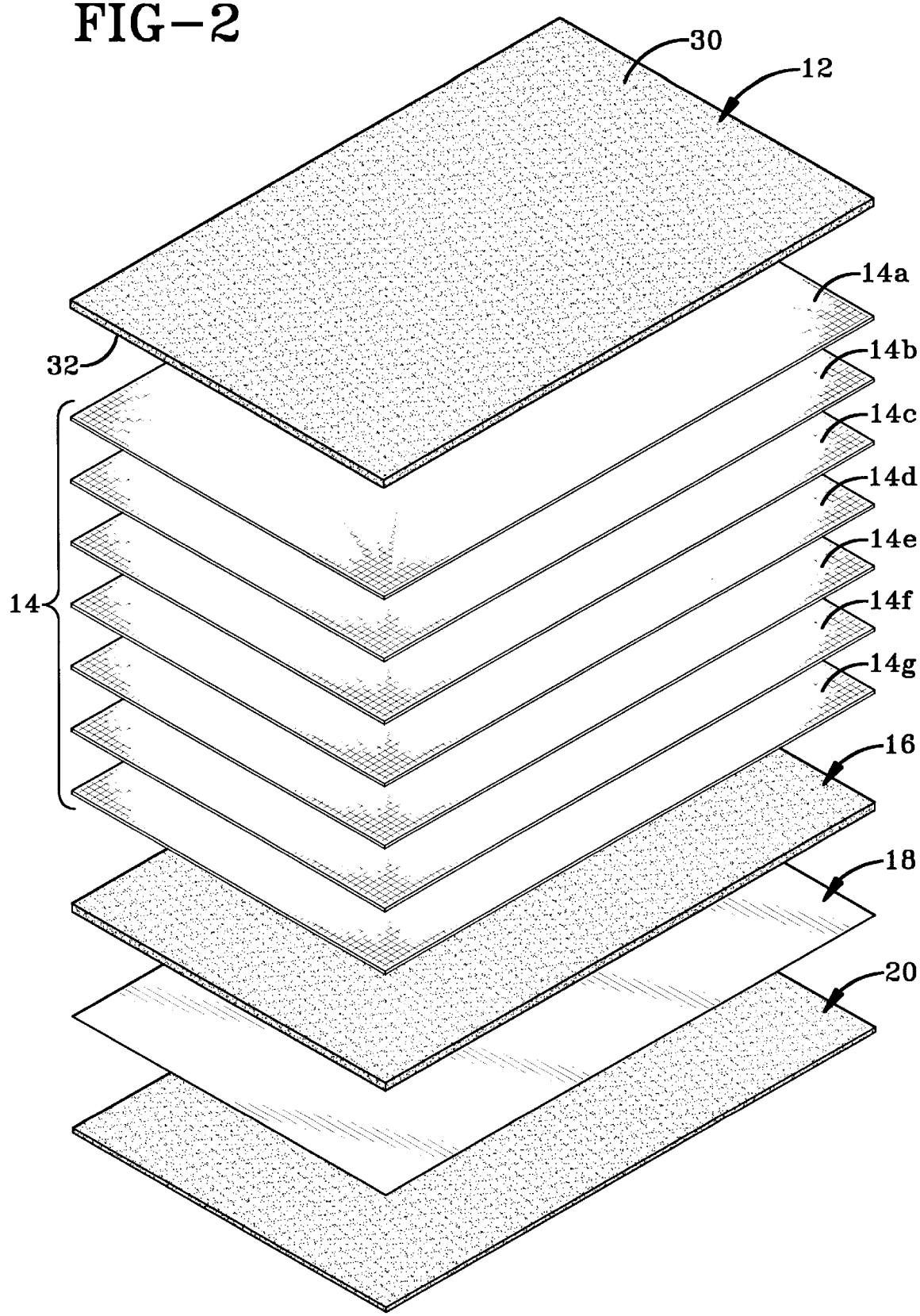

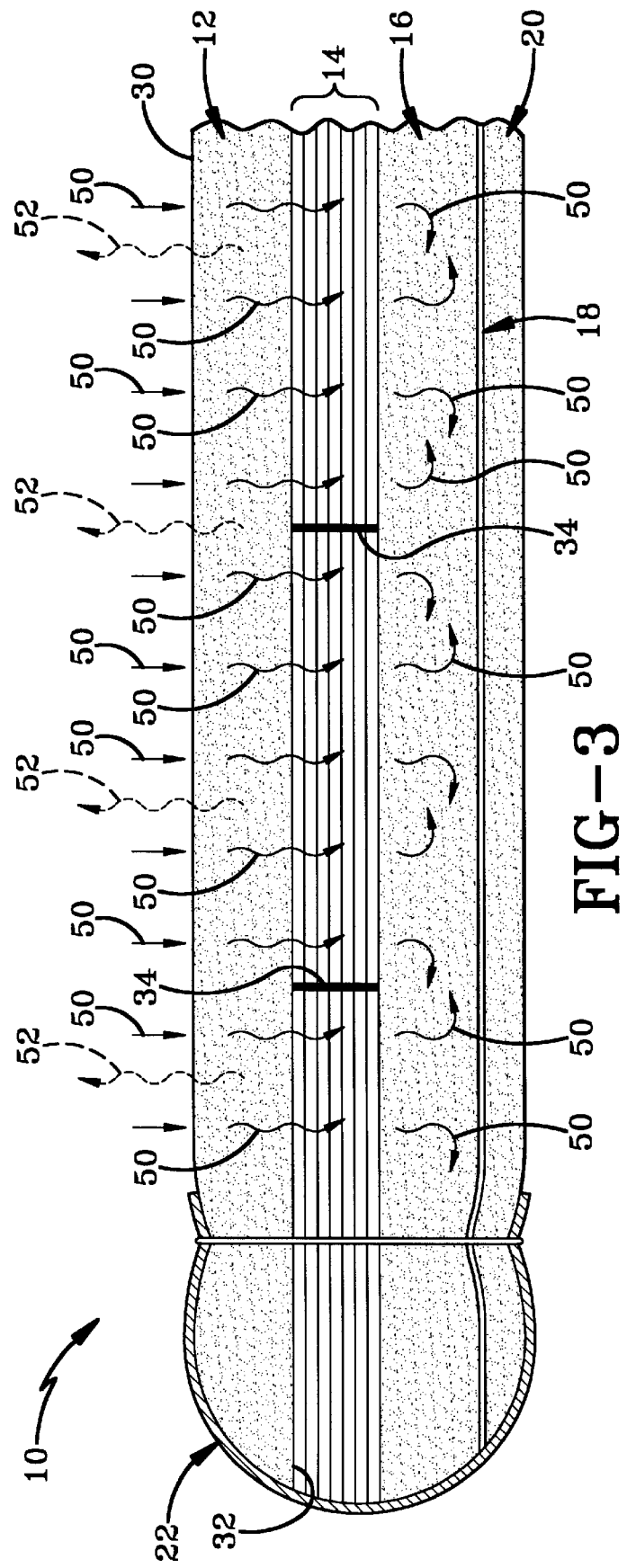

4,822,669 utilizes a top layer that is itself fabricated
FLOOR MAT

BACKGROUND OF THE INVENTION

1. Technical Field

The present invention generally relates to floor mats and more particularly to floor mats configured to absorb and hold water from shoes, boots, dripping umbrellas and other items that bring water into a building. Specifically, the present invention is related to a floor mat that includes a plurality of absorbent layers of melt blown polypropylene disposed between layers of needle punched polypropylene whereby liquid is drawn from the upper layer of the mat and wicked toward the bottom of the mat where it is held until it evaporates.

2. Description of the Prior Art

Floor mats are required immediately inside most exterior doorways in wet or winter climates as a safety measure against wet and slippery floors and to protect carpeted floors. A floor mat absorbs water from a person's feet when the person enters a room and provides traction on for a surface that may otherwise become dangerously slippery. Floor mats also allow a person to wipe mud, snow, or other debris from their feet upon entering a building. As such, the floor mat must be durable and resistant to the wiping and tearing forces created by people's feet as well as being able to absorb and retain relatively large amounts of water.

Unfortunately, some floor mats available today become waterlogged during snowy weather or heavy rain. A waterlogged floor mat is more undesirable than a wet floor because a waterlogged mat will cause people to pick up moisture on their feet and track it into the building long after the rain or snow outside the building has stopped. A waterlogged floor mat is also undesirable because of the length of time required to dry the mat. Wet floor mats may also mold or mildew if continually left damp.

Floor mats must also provide traction to people entering the building to prevent slip and fall accidents. Such traction is difficult to maintain as the floor around and under the mat becomes wet. When the floor becomes wet, the floor mat may slip on the floor creating a dangerous situation. Even mats with tractive devices disposed to engage the floor may slip once the floor is covered with water. One manner of preventing such slipping is to anchor the mat to the floor with devices such as hooks. Such anchoring is generally undesirable because of the cost of modifying the floors to accommodate the anchors.

In view of the need for floor mats that absorb and retain liquid, products have been developed such as the floor mats disclosed in U.S. Pat. Nos. 3,578,738, 4,822,669, and 5,429, 854. For instance, the floor mat disclosed in U.S. Pat. No. 3,578,738 utilizes an intermediate foam layer to soak up moisture covered by a removable top layer with both pieces being held in a liquid-impervious tray. The tray is snap fit into a frame which holds the edge portions of the foam and the top layer in place. The floor mat disclosed in U.S. Pat. No. 4,822,669 utilizes a top layer that is itself fabricated from an absorbent material that serves to retain liquid that enters the mat. This absorbent layer is separated from a bottom layer by a film of polyurethane. This floor mat thus uses the top layer upon which people walk to absorb and hold the liquid deposited on the floor mat. The floor mat disclosed in U.S. Pat. No. 5,429,854 utilizes a top layer of melt blown material that forms an abrasive surface layer over an intermediate absorbent melt blown layer which is itself supported on a lower carrier layer. Each of these mats utilizes a different materials and combinations of layers to provide floor mat that absorbs water and resists tearing. Although these mats are suitable for their intended purposes, room for improvement remains in the art.

SUMMARY OF THE INVENTION

A primary objective of the present invention is to provide a floor mat capable of absorbing and retaining water deposited on its upper surface.

Another objective of the invention is to provide a floor mat that does not slip on the floor when the floor is wet.

Yet another objective of the invention is to provide a floor mat that is durable and resistant to wiping and the forces created on the mat by people's feet.

Still another objective of the invention is to provide a floor mat that allows liquid retained in the mat to be in fluid communication with the atmosphere around the floor mat so that it may be evaporated to dry the mat.

A further objective of the present invention is to provide a floor mat that includes a liquid impervious layer that prevents the liquid absorbed and retained by the floor mat from soaking through the bottom layer of the floor mat.

Still a further objective of the present invention is to provide a floor mat having a non-skid bottom layer that is does not slip on a wet surface and can be cleaned without losing its non-slip capabilities.

Another objective of the present invention is to provide a floor mat having an intermediate layer fabricated from a plurality of individual layers that wick liquid from the top of the floor mat towards the bottom of the floor mat and retain the liquid where it may be evaporated.

A further objective of the present invention is to provide a floor mat that can be easily fabricated and configured into a wide variety of different shapes and sizes.

Another objective of the present invention is to provide a floor mat having an edge binding that allows water to seep out of the edges of the floor mat instead of the top of the mat and which can wick water back into the floor mat from the areas immediately surrounding the floor mat.

Another objective of the present invention is to provide a floor mat that is of simple construction, which achieves the stated objectives in a simple, effective, and inexpensive manner, in which solves the problems and which satisfies the needs existing in the art.

These and other objectives and advantages are obtained by the improved floor mat of the present invention, the general nature of which may be stated as including an upper layer having a top surface and a bottom surface, the upper layer capable of absorbing liquid and wicking the liquid from the top surface toward the bottom surface; an upper intermediate layer disposed adjacent the upper layer, the upper intermediate layer having a perimeter about its outer surface, the upper intermediate layer capable of wicking liquid from the upper layer and holding liquid within the perimeter; a lower intermediate layer disposed adjacent the upper intermediate layer, the lower intermediate layer capable of absorbing and retaining liquid from the upper intermediate layer when the upper intermediate layer is saturated; a liquid impervious layer disposed below the lower intermediate layer; a non-slip layer; and an edge binding extending about each of the layers and holding the layers together.

BRIEF DESCRIPTION OF THE DRAWINGS

The preferred embodiment of the invention, illustrative of the best mode in which applicant has contemplated applying the principles of the invention, is set forth in the following description and is shown in the drawings and is particularly and distinctly pointed out and set forth in the appended claims.

FIG. 1 a perspective view of a floor mat made in accordance with the concepts of the present invention;

FIG. 2 is an exploded view of the floor mat of the present invention with the edge binding removed; and FIG. 3 is a sectional view taken substantially along line 3—3 of FIG. 1 showing the liquid paths into and out of the floor mat.

Similar numbers refer to similar parts throughout the specification.

DESCRIPTION OF THE PREFERRED EMBODIMENT

A floor mat made in accordance with the concepts of the present invention is depicted in the accompanying drawings and is indicated generally by the numeral 10. Floor mat 10 generally includes an upper layer, indicated generally by the numeral 12, a pair of intermediate layers, indicated generally by the numerals 14 and 16, a liquid-impervious layer, indicated generally by the numeral 18, and a non-slip layer, indicated generally by the numeral 20. These layers, 12, 14, 16, 18, and 20 are bound together by an edge binding that is indicated generally by the numeral 22. Floor mat 10 is capable of being walked on and withstanding a person scraping their feet on upper layer 12 of floor mat 10. Floor mat 10 is also capable of absorbing and retaining liquid, such as water from rain or melted snow, within floor mat 10. Mat 10 is also configured to retain the liquid until it can be evaporated out of mat 10 into the surrounding atmosphere.

Upper layer 12 may be preferably fabricated from a non-woven synthetic material such as polypropylene. A needle-punched polypropylene may be preferably used to provide the properties desired in floor mat 10. Upper layer 12 is capable of receiving liquid on its upper surface 30 and transferring the liquid toward its bottom layer 32 by a wicking action. As is known in the art, wicking functions like capillary action where a liquid may be drawn from one position to another position by the material and the surface tension of the liquid. Upper layer 12 is porous such that it provides fluid communication with the surrounding atmosphere. The fluid communication allows liquid held in upper layer 12 and layers 14 and 16 to evaporate through upper layer 12 to the atmosphere surrounding floor mat 10. Upper layer 12 also holds large particles of debris and dirt on its upper surface while retaining smaller particles of dirt and debris in its body thus preventing the dirt particles from reaching intermediate layers 14 and 16. Dirt and debris may thus be washed from floor mat 10 relatively easily.

Intermediate layers 14 and 16 absorb and retain liquid that pass through upper layer 12. Upper intermediate layer 14 is configured to retain the large amounts of water that will pass through upper layer 12 during regular use during wet weather. When floor mat 10 is subjected to heavy traffic during extremely wet weather or heavy snow, upper intermediate layer 14 may become fully saturated with liquid. Once upper intermediate layer 14 is fully saturated, lower intermediate layer 16 starts to absorb liquid from upper intermediate layer 14. Lower intermediate layer 16 continues to absorb and retain water until it is fully saturated. Liquid impervious layer 18 prevents the liquid in lower intermediate layer 16 from passing through the bottom of floor mat 10. Thus, liquid may seep out of the edge of floor mat 10 once layers 12, 14, and 16 are fully saturated with water. By allowing the extra liquid to seep out of the edges of floor mat 10, floor mat 10 does not allow the water to pool on upper surface 30 of upper layer 12.

Upper intermediate layer 14 is fabricated from a material that is capable of absorbing and retaining large volumes of liquid in relation to the volume of the material. The material is also preferably capable of wicking liquid from its upper surface towards its bottom surface as well as evenly distributing the liquid within its body. This wicking action prevents upper intermediate layer 14 from becoming over saturated in one area while being under saturated in another area. Upper intermediate layer 14 is preferably fabricated from melt blown polypropylene. In the preferred embodiment of the present invention, upper intermediate layer 14 includes a plurality of individual melt blown polypropylene sheets 14a, 14b, 14c, 14d, 14e, 14f, and 14g. The individual absorbent layers 14a, 14b, 14c, 14d, 14e, 14f, and 14g may be connected in at least one location inside the perimeter of edge binding 22 to prevent layers 14a, 14b, 14c, 14d, 14e, 14f, and 14g from sliding over one another and to promote better wicking. Although a variety of connections may be used that are known in the art, the preferred embodiment of the present invention utilizes welds 34 at locations disbursed about layers 14a, 14b, 14c, 14d, 14e, 14f, and 14g to hold the layers together. The layered levels of upper intermediate layer 14 function to keep water close to upper layer 12 where it may be evaporated. As such, layer 14a substantially fills with water before the water is wicked down into next layer 14b. Similarly, layer 14b then substantially fills with water before the water is wicked down into layer 14c.

As described above, lower intermediate layer 16 is utilized to absorb and retain liquid from upper intermediate layer 14 after upper intermediate layer 14 becomes over saturated with liquid. Lower intermediate layer 16 is preferably fabricated from a non-woven material that is capable of wicking water away from upper intermediate layer 14 and distributing the water evenly throughout its body. Lower intermediate layer 16 may be preferably fabricated from a non-woven needle punched polypropylene similar to the material from which upper layer 12 is fabricated.

Liquid-impervious layer 18 is disposed directly below and adjacent to lower intermediate layer 16. Liquid-impervious layer 18 seals the bottom of lower intermediate layer 16 such that liquid contained within lower intermediate layer 16 may not pass through the bottom of floor mat 10. This prevents floor mat 10 from slipping on the floor from the liquid that seeps through mat 10. Liquid-impervious layer 18 also reduces clean up time because water does not seep out of the bottom of mat 10. As discussed above, liquid may seep out of mat 10 through edge binding 22 when both intermediate layers 14 and 16 become completely saturated. As liquid evaporates from mat 10, edge binder 22 is configured to wick this liquid back into mat 10. Liquid-impervious layer 18 is preferably substantially thinner than the thickness of upper layer 12 and intermediate layers 14 and 16.

Edge binding 22 is fabricated from a nylon thread that is repeatedly stitched through the edges of layers 12, 14, 16, 18, and 20. Edge binding 22 maintains the relative position of the layers with respect to each other. Binding 22 also allows water to leave floor mat 10 when intermediate layers 14 and 16 become saturated with water. Thus, edge binding 22 is not configured to be liquid-impervious.

Non-slip layer 20 is carried by the bottom surface of liquid-impervious layer 18. Non-slip layer 20 may be preferably fabricated from a dry adhesive disposed over a thin foam layer. Dry adhesive maintains its adhesive properties even while being wet and may be washed or wetted and then dried without losing its adhesive properties. Non-slip layer 20 thus maintains the position of floor mat 10 on a floor even while floor mat 10 is entirely saturated with water or surrounded with water on the floor.

As shown in FIG. 3, liquid, indicated generally by the arrows labeled with the numeral 50, enters floor mat 10 at upper surface 30 of upper layer 12. Liquid 50 may come from people's feet, wet umbrellas, or from spills. The liquid is absorbed into upper layer 12 and is then wicked into upper intermediate layer 14. Water continues to be wicked into upper intermediate layer 14 until it completely fills and evenly spreads throughout intermediate layer 14. Once intermediate layer 14 is saturated with liquid, lower intermediate layer 16 starts to wick water from upper intermediate layer 14 into its body where it is retained by liquid-impervious layer 18. Upper layer 12 and upper intermediate layer 14 are configured to hold a relatively large volume of water that may be deposited on floor mat 10 during regular use. Upon heavy use during wet weather, both upper layer 12 and upper intermediate layer 14 may become saturated with water. As this occurs, lower intermediate layer 16 starts to wick water from upper intermediate layer 14. This continues until lower intermediate layer 16 is saturated. Additional water seeps out through edge binding 22 as people walk on floor mat 10. Upper layer 12 is adapted to allow water to evaporate from floor mat 10. Such evaporation is depicted in FIG. 3 by the arrows labeled with the numeral 52. The evaporation allows floor mat 10 to dry and wick water immediately adjacent floor mat 10 back into floor mat 10.

Accordingly, the improved floor mat is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the floor mat is constructed and used, the characteristics of the construction, and the advantageous new and useful results obtained; the new and useful structures, devices, elements, arrangements, parts, and combinations are set forth in the appended claims.

I claim:

1. A floor mat comprising:
    an upper layer having a top surface and a bottom surface, said upper layer capable of absorbing liquid and wicking said liquid from said top surface toward said bottom surface;
    an upper intermediate layer disposed adjacent said upper layer, said upper intermediate layer capable of wicking liquid from said upper layer and holding liquid; said upper intermediate layer being fabricated from melt blown polypropylene;
    a lower intermediate layer disposed adjacent said upper intermediate layer, said lower intermediate layer capable of absorbing and retaining liquid from said upper intermediate layer when said upper intermediate layer is saturated; said lower intermediate layer being fabricated from needle punched polypropylene;
    a liquid impervious layer disposed below said lower intermediate layer;
    a non-slip layer; and
    an edge binding extending about each of said layers and holding said layers together.

2. A floor mat according to claim 1, wherein said upper layer is fabricated from a non-woven material.

3. A floor mat according to claim 2, wherein said non-woven material is a needle punched polypropylene.

4. A floor mat according to claim 1 wherein said upper layer absorbs water but retains dirt particles adjacent said top layer of said upper layer where said dirt particles may be removed during washing.

5. A floor mat according to claim 1 wherein said upper layer allows liquid to evaporate from said upper layer and through said upper layer from said upper intermediate layer.

6. A floor mat according to claim 1 wherein said upper intermediate layer includes a plurality of individual absorbent layers.

7. A floor mat according to claim 6 wherein said plurality of individual absorbent layers are connected together in at least one location within said edge binding.

8. A floor mat according to claim 7 wherein said individual absorbent layers are connected by welds.

9. A floor mat according to claim 1 wherein said lower intermediate layer is fabricated from a non-woven material.

10. A floor mat according to claim 1 wherein said liquid impervious layer is fabricated from vinyl.

11. A floor mat according to claim 1 wherein said liquid-impervious layer has a thickness, said upper layer and said lower intermediate layer having thicknesses, said thickness of said liquid impervious layer being substantially less than said thicknesses of said upper and lower layers.

12. A floor mat according to claim 1 wherein said liquid-impervious layer prevents liquid in said upper layer, said upper intermediate layer, and said lower intermediate layer from seeping out the bottom of the mat.

13. A floor mat according to claim 1 wherein said non-slip layer includes a dry adhesive applied on a layer of foam.

14. A floor mat according to claim 1 wherein said edge binding is capable of wicking liquid into said layers from the area immediately adjacent the floor mat.

15. A floor mat according to claim 14 wherein said edge binding is formed with a heavy duty nylon thread.

16. A floor mat according to claim 15 where said edge binding is an industrial serge binding stitch.

17. A floor mat comprising:
    an upper layer having a top surface and a bottom surface, said upper layer capable of absorbing liquid and wicking said liquid from said top surface toward said bottom surface;
    an upper intermediate layer disposed adjacent said upper layer, said upper intermediate layer capable of wicking liquid from said upper layer and holding liquid; said upper intermediate layer including a plurality of individual absorbent layers having outer edges; said individual absorbent layers being connected only at said outer edges; each of said individual absorbent layers being fabricated from melt blown polypropylene;
    a lower intermediate layer disposed adjacent said upper intermediate layer, said lower intermediate layer capable of absorbing and retaining liquid from said upper intermediate layer when said upper intermediate layer is saturated;
    a liquid impervious layer disposed below said lower intermediate layer;
    a non-slip layer; and
    an edge binding extending about each of said layers and holding said layers together.

18. The floor mat of claim 17, wherein said lower intermediate layer is fabricated from a needle punched polypropylene.

* * * * *